United States Patent
Rahman et al.

(10) Patent No.: US 10,728,944 B2
(45) Date of Patent: Jul. 28, 2020

(54) INDICATION TO THE MASTER E-NODE B OF SUCCESSFUL PRIMARY SECONDARY CELL ACTIVATION IN DUAL CONNECTIVITY

(71) Applicant: Telefonaktiebolaget LM Ericsson (publ), Stockholm (SE)

(72) Inventors: Imadur Rahman, Sollentuna (SE); Muhammad Kazmi, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/515,544

(22) PCT Filed: Sep. 29, 2015

(86) PCT No.: PCT/SE2015/051030
§ 371 (c)(1),
(2) Date: Mar. 29, 2017

(87) PCT Pub. No.: WO2016/053174
PCT Pub. Date: Apr. 7, 2016

(65) Prior Publication Data
US 2017/0223763 A1 Aug. 3, 2017

Related U.S. Application Data

(60) Provisional application No. 62/056,783, filed on Sep. 29, 2014.

(51) Int. Cl.
*H04W 76/15* (2018.01)
*H04W 74/00* (2009.01)
*H04W 74/08* (2009.01)

(52) U.S. Cl.
CPC ......... *H04W 76/15* (2018.02); *H04W 74/004* (2013.01); *H04W 74/006* (2013.01); *H04W 74/0833* (2013.01)

(58) Field of Classification Search
CPC ... H04W 76/15; H04W 76/10; H04W 74/006; H04W 74/002; H04W 74/004; H04W 74/0833

(Continued)

(56) References Cited

U.S. PATENT DOCUMENTS

| | | | |
|---|---|---|---|
| 7,917,113 B2 * | 3/2011 | Palenius | H04W 36/0088 370/324 |
| 2012/0250578 A1 * | 10/2012 | Pani | H04W 48/12 370/254 |

(Continued)

OTHER PUBLICATIONS

International Search Report and Written Opinion Corresponding to International Application No. PCT/SE2015/051030; dated Dec. 23, 2015; 10 Pages.

(Continued)

*Primary Examiner* — Kwang B Yao
*Assistant Examiner* — Syed M Bokhari
(74) *Attorney, Agent, or Firm* — Patent Portfolio Builders, PLLC

(57) ABSTRACT

There is disclosed a method for operating a network node in a wireless communication network, the network node being connected to a terminal via a first cell group. The method comprises receiving, by the network node, information indicating an activation status of the terminal regarding a second cell group, wherein the method further comprises transmitting, by the network node, further information based on the received information to the terminal and/or one or more further network nodes.

The disclosure also pertains to related methods and devices.

6 Claims, 9 Drawing Sheets

(58) Field of Classification Search
USPC .............. 370/329, 311, 331, 324, 252, 216
See application file for complete search history.

(56) References Cited

U.S. PATENT DOCUMENTS

| | | | |
|---|---|---|---|
| 2014/0086127 A1* | 3/2014 | Kim | H04L 5/001 370/311 |
| 2014/0198742 A1* | 7/2014 | Baldemair | H04W 74/0833 370/329 |
| 2015/0029955 A1* | 1/2015 | Heo | H04W 4/70 370/329 |
| 2015/0223149 A1* | 8/2015 | Liu | H04W 48/12 370/252 |
| 2016/0037405 A1* | 2/2016 | Choi | H04W 76/10 455/444 |
| 2016/0057800 A1* | 2/2016 | Ingale | H04W 56/0005 370/216 |
| 2016/0219475 A1* | 7/2016 | Kim | H04L 5/00 |

OTHER PUBLICATIONS

"Activation and Deactivation for Dual Connectivity," 3GPP Draft; R2-141487, 3$^{rd}$ Generation Partnership Project (3GPP) vol. RAN WG2, Mar. 22, 2014, http://www.3gpp.org/ftp/Meetings_3GPP_SYNC/RAN2/Docs, 4 Pages.

"Dual Connectivity, RRC Signalling on Xn and Uu," 3GPP Draft, R2-141532, 3$^{rd}$ Generation Partnership Project (3GPP) vol. RAN WG2, Mar. 22, 2014, http://www.3gpp.org/ftp/Meetings_3gpp_SYNC/RAN2/Docs, 6 Pages.

"SCE Signalling Flows, Discussion of Remaining Issues," 3GPP Draft R2-140588, 3$^{rd}$ Generation Partnership Project (3GPP) vol. RAN WG2, Feb. 9, 2014, http://www.3gpp.org/Meeting_3gpp_SYNC/RAN2/Docs, 7 Pages.

"Selection of pSCell," 3GPP Draft, R2-140591, 3$^{rd}$ Generation Partnership Project (3GPP) vol. RAN WG2, Feb. 9, 2014, http://www.3gpp.org/ftp/Meetings_3gpp_Sync_RAN2/Docs, 2 Pages.

Office Action issued in application No. 15781460.9, dated Aug. 17, 2018; 9 pages.

* cited by examiner

INDICATION TO THE MASTER E-NODE B OF SUCCESSFUL PRIMARY SECONDARY CELL ACTIVATION IN DUAL CONNECTIVITY

CROSS REFERENCE TO RELATED APPLICATION

This application is a 35 U.S.C. § 371 national stage application of PCT International Application No. PCT/SE2015/051030, filed on 29 Sep. 2015, which itself claims priority to U.S. provisional Application No. 62/056,783, filed 29 Sep. 2014, the disclosure and content of both which are incorporated by reference herein in their entirety.

TECHNICAL FIELD

The present disclosure pertains to wireless communication technology, in particular in the context of dual connectivity.

BACKGROUND

In LTE, like in other wireless communication systems, a mobile terminal may need to contact the network (e.g. via an eNodeB) without having a dedicated resource in the Uplink (from terminal to base station). To handle this, a random access procedure may be available, according to which a terminal or UE that does not have a dedicated UL resource may transmit a signal to the base station. The first message of this procedure is typically transmitted on a special resource reserved for random access (which is not normally dedicated to a specific terminal, but available to all terminals intending to perform random access), a physical random access channel (PRACH). This channel can for instance be limited in time and/or frequency (as in LTE), see e.g. FIG. 1.

The resources available for PRACH transmission are provided or indicated to the terminals as part of the broadcasted system information in system information block 2 (SIB-2) (or as part of dedicated RRC signaling in case of e.g. handover).

The resources consist of a preamble sequence and a time/frequency resource. In each cell, there are 64 preamble sequences available. Two subsets of the 64 sequences are defined, where the set of sequences in each subset is signaled as part of the system information. When performing a (contention-based) random-access attempt, the terminal selects at random one sequence in one of the subsets. As long as no other terminal is performing a random-access attempt using the same sequence at the same time instant, no collisions will occur and the attempt will, with a high likelihood, be detected by the eNodeB.

When the terminal is to be connected via multiple cells or cell groups, e.g. in dual connectivity, activation of different cells or cell groups (e.g., via random access) may be performed or fail without the nodes not directly associated to the respective group being informed. This may lead to problems in managing or controlling terminals in dual connectivity.

SUMMARY

An object of the present disclosure is to present approaches to provide improved dual connectivity functionality for wireless communication networks, in particular improved control functionality.

There is disclosed a method for operating a network node in a wireless communication network, the network node being connected to a terminal via a first cell group. The method comprises receiving, by the network node, information indicating an activation status of the terminal regarding a second cell group. The method further comprises transmitting, by the network node, further information based on the received information to the terminal and/or one or more further network nodes.

There is also disclosed a network node for a wireless communication network, the network node being connected or connectable to a terminal via a first cell group. The network node is adapted for receiving information indicating an activation status of the terminal regarding a second cell group, and is also adapted for transmitting, based on the received information, further information to the terminal and/or one or more further network nodes.

Moreover, a method for operating a secondary network node in a wireless communication network is disclosed, wherein the secondary network node is connected or connectable to terminal via a secondary cell group. The method comprises determining, by the secondary network node, the activation status of the terminal regarding the secondary cell group, and transmitting, to a network node, information indicating the activation status.

In addition, there is disclosed a secondary network node for a wireless communication network, the secondary network node being connected or connectable to a terminal via a secondary cell group. The secondary network node is adapted for determining the activation status of the terminal regarding the secondary cell group and for transmitting, to a network node, information indicating the activation status.

A method for operating a terminal in a wireless communication network is also disclosed. The terminal is adapted for dual connectivity, and is connected or connectable to a secondary cell group. The method comprises transmitting, to a network node, information indicating the activation status of the terminal regarding the secondary cell group.

Furthermore, there is described a terminal for a wireless communication network, the terminal being adapted for dual connectivity. The terminal further is adapted for being connected or connectable to a secondary cell group. Furthermore, the terminal is adapted for transmitting, to a network node, information indicating the activation status of the terminal regarding the secondary cell group.

A program product comprising code executable by control circuitry is also disclosed, the code causing the control circuitry to carry out and/or control any of the methods described herein.

Moreover, a carrier medium carrying and/or storing any program product disclosed herein and/or code executable by control circuitry is described, the code causing the control circuitry to perform and/or control any of the methods described herein.

According to suggested approaches, one node connected to a terminal via a cell group may be informed about the activation status of the terminal regarding a different cell group, allowing early new activation tries and efficient management of dual connectivity.

DETAILED DESCRIPTION

In the following, the terms terminal and user equipment (UE) may be used interchangeably. The same holds for the terms network node, eNodeB and base station.

Figure 1:
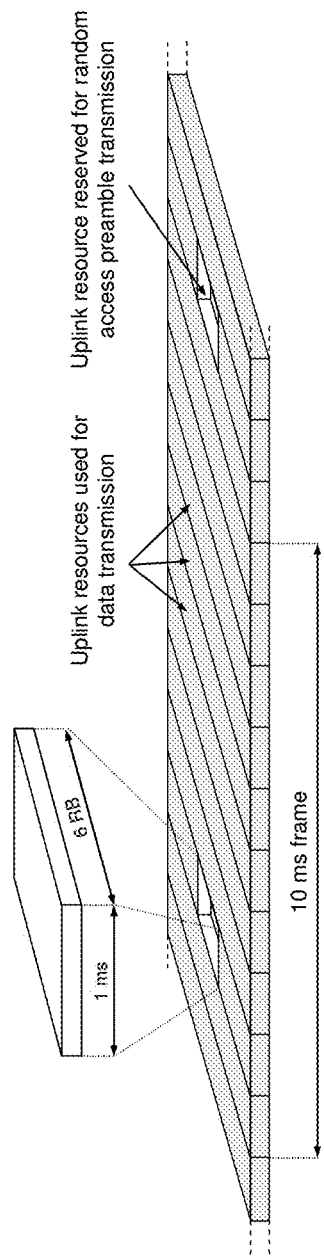
FIG. 1 shows a principal illustration of random-access-preamble transmission.

FIG. 1 shows a principal illustration of random-access-preamble transmission.

In LTE or according to other wireless communication standards, the random access procedure can be used for a number of different purposes, e.g.:
  initial access (for terminals/UEs in the RRC_IDLE state),
  incoming handover,
  resynchronization of the UL,
  scheduling request (for a terminal/UE that is not allocated any other resource for contacting the base station),
  positioning.

Figure 2:
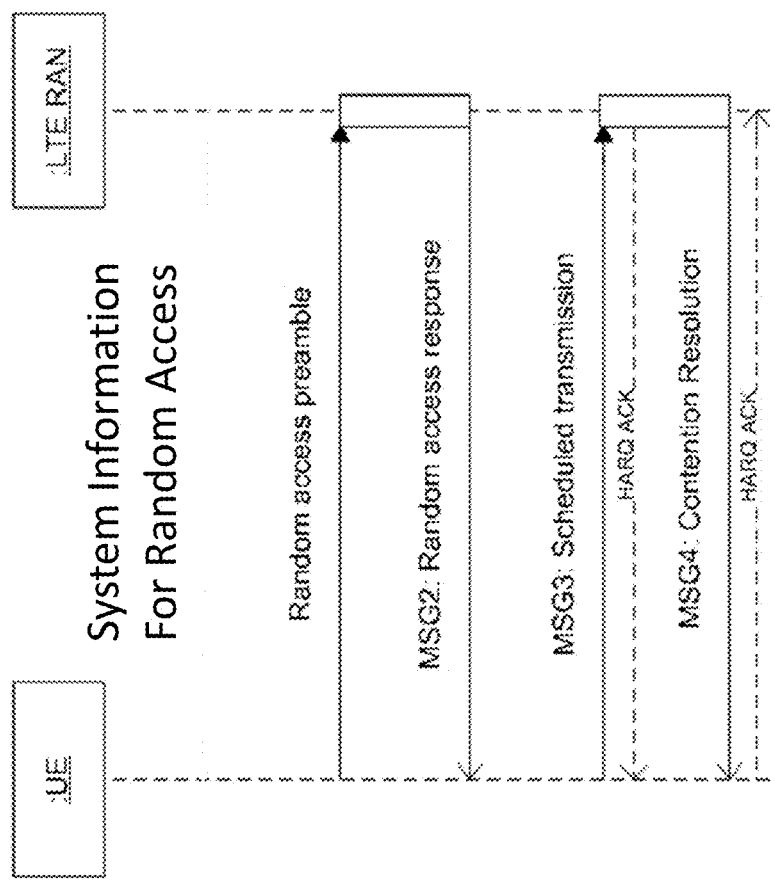
FIG. 2 shows signalling over the air interface (or RAN) for the contention-based random access procedure in LTE.

The contention-based random access procedure used in LTE Rel-10 is illustrated in FIG. 2. The terminal or UE starts the random access procedure by randomly selecting one of the preambles available for contention-based random access. The terminal or UE then transmits the selected random access preamble on the physical random access channel (PRACH) to eNodeB in RAN.

FIG. 2 shows signalling over the air interface (or RAN) for the contention-based random access procedure in LTE.

The RAN acknowledges any preamble it detects by transmitting a random access response (MSG2) including an initial grant to be used on the uplink shared channel, a temporary C-RNTI (TC-RNTI), and a time alignment (TA) update based on the timing offset of the preamble measured by the eNodeB on the PRACH. The MSG2 is transmitted in the DL to the UE using the PDSCH and its corresponding PDCCH message that schedules the PDSCH contains a cyclic redundancy check (CRC) which is scrambled with the RA-RNTI.

When receiving the response, the terminal or UE uses the grant to transmit a message (MSG3) that in part is used to trigger the establishment of radio resource control and in part to uniquely identify the UE on the common channels of the cell. The timing alignment command provided in the random access response is applied in the UL transmission in MSG3.

In addition, the eNB can also change the resource blocks that are assigned for a MSG3 transmission by sending an UL grant that has its CRC scrambled with the TC-RNTI which was included in MSG2. In this case the PDCCH is used, to transmit the DCI containing the uplink grant.

The MSG4 which is then contention resolving has its PDCCH CRC scrambled with the C-RNTI if the UE previously has a C-RNTI assigned. If the UE does not have a C-RNTI previously assigned has its PDCCH CRC is scrambled with the TC-RNTI obtained from MSG2.

Figure 3:
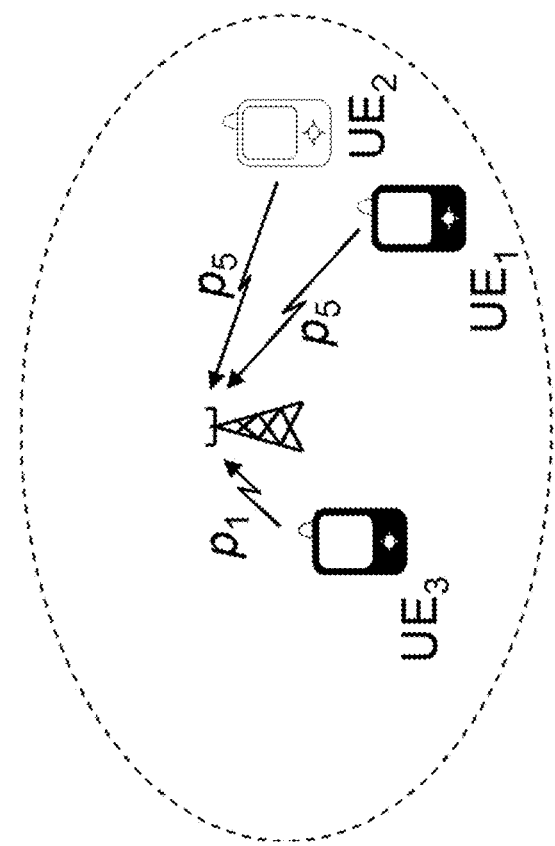
FIG. 3 shows an illustration of contention based random access, where there is contention between two UEs.

The procedure ends with RAN solving any preamble contention that may have occurred for the case that multiple terminals or UEs transmitted the same preamble at the same time. This can occur since each terminal or UE randomly selects when to transmit and which preamble to use. If multiple UEs select the same preamble for the transmission on RACH, there will be contention between these UEs that needs to be resolved; the terminals or UEs will be informed accordingly via the contention resolution message (MSG4). The case when contention occurs is illustrated in FIG. 3, where two UEs transmit the same preamble, $p_5$, at the same time. A third UE also transmits at the same RACH, but since it transmits with a different preamble, $p_1$, there is no contention between this UE and the other two UEs.

FIG. 3 shows an illustration of contention based random access, where there is contention between two UEs.

A terminal or UE may also perform non-contention based random access. A non-contention based random access or contention free random access can e.g. be initiated by the eNB to get the terminal or UE to achieve synchronisation in UL. The eNB initiates a non-contention based random access either by sending a PDCCH order or indicating it in an RRC message. The later of the two is used e.g. in case of HO (handover).

The eNB can also order the UE through a PDCCH message to perform a contention based random access; the procedure for this is illustrated in FIG. 2.

Figure 4:
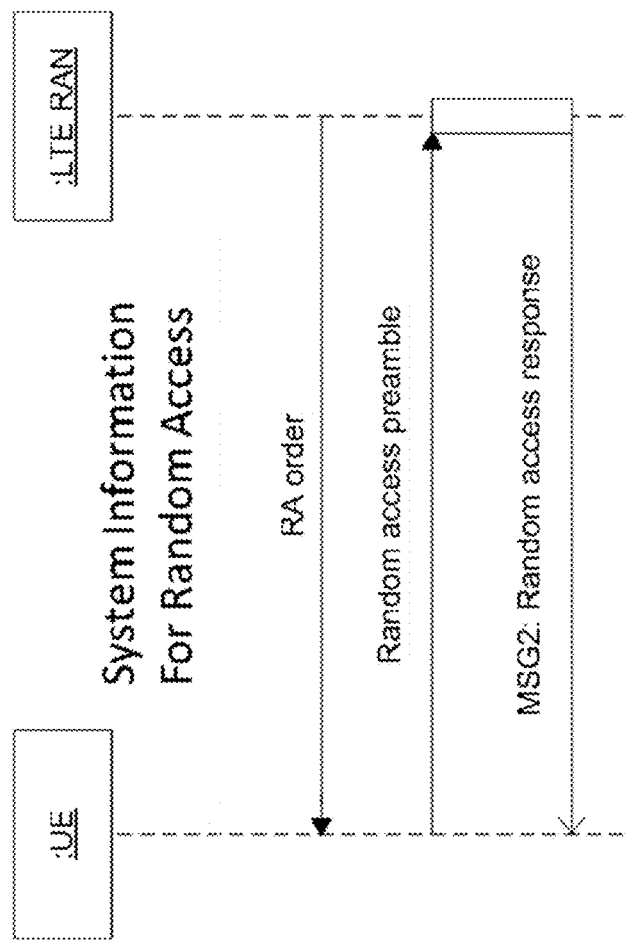
FIG. 4 shows an illustration of contention free random access.

The procedure for the UE to perform contention free random access is illustrated in FIG. 4. Similar to the contention based random access, the MSG2 is transmitted in the DL to the UE and its corresponding PDCCH message CRC is scrambled with the RA-RNTI. The UE may consider the random access successfully completed and/or the corresponding cell being activated after it has received MSG2 successfully.

For the contention free random access as for the contention based random access does the MSG2 contain a timing alignment value, which may be seen as a timing parameter.

MSG2 of a random access procedure (either contention based or contention free) may generally be seen as example for a timing message.

The MSG2 enables the eNB to set the initial/updated timing (e.g., for a cell served by the network node the random access process is performed with) according to the preamble transmitted by the terminal or UE. Receiving MSG2 enables the terminal to activate the cell by performing time alignment to the cell.

FIG. 4 shows signalling over the air interface for the contention-free random access procedure in LTE.

Dual connectivity is described in the following. A dual connectivity framework is being considered e.g. for LTE Rel-12. Dual Connectivity refers to the operation where a given terminal or UE consumes and/or utilizes radio resources provided and/or allocated by at least two different network points or network nodes (Master eNB, MeNB and (at least one) Secondary eNB, SeNB) connected with non-ideal backhaul while in RRC_CONNECTED.

A terminal or UE in dual connectivity maintains simultaneous connections to anchor and booster nodes, where the MeNB may interchangeably be referred to as anchor node and the SeNB interchangeably be referred to booster node.

As the name implies, the MeNB may have control functionality and, for example, may control the connection and handover e.g. between different SeNBs. Signaling from the MeNB may thus be needed even for control at the SeNB level, in particular for changes at a SeNB or for SeNB handover. Both the anchor node and booster node may be adapted to terminate (they may be end points of) the control plane connection towards the terminal and may thus be controlling nodes of the terminal or UE.

The terminal or UE may read system information from the anchor. In addition to the anchor, the UE may be connected to one or several booster nodes for added user plane support. The MeNB and SeNB may be connected via an interface, e.g. a Xn interface, which may be selected to be the same as the X2 interface between two eNBs according to LTE.

More specifically, dual connectivity (DC) may be considered a mode of operation of a terminal, which may be in RRC_CONNECTED state with at least one network node, in which the terminal is configured with a Master Cell Group (MCG) and a Secondary Cell Group (SCG). A Cell Group (CG) may be a group of serving cells associated with either the MeNB or the SeNB. The MCG and SCG may be defined as follows:

A Master Cell Group (MCG) is a group of serving/communication cells associated with and/or provided or serviced by the MeNB, the cells comprising at least a PCell and optionally one or more SCells (the group may have one cell only, which may be considered the PCell; for carrier aggregation, there may be one or more SCells within the MCG).

A Secondary Cell Group (SCG) is a group of serving/communication cells associated with and/or provided or serviced by the SeNB, the cells comprising at least a pSCell (Primary Scell) and optionally one or more SCells (the group may have one cell only, which may be considered the pSCell; for carrier aggregation, there may be one or more SCells within the SCG).

A master network node may be implemented as a master eNB, which may be the eNB terminating at least S1-MME (having a control pathway or connection to the MME (for LTE, via a S1 interface), and/or may be connected and/or have a control pathway to a core network or a higher-level node). A secondary network node may be a secondary eNB, which may be a eNB that is providing additional radio/communication resources for the terminal or UE, but is not the Master network node.

A PCell or pSCell may be a primary cell in carrier aggregation, wherein main control functionality for the associated SCells of the cell group/carrier aggregated group may be carried/transmitted via the primary cell.

Figure 5:
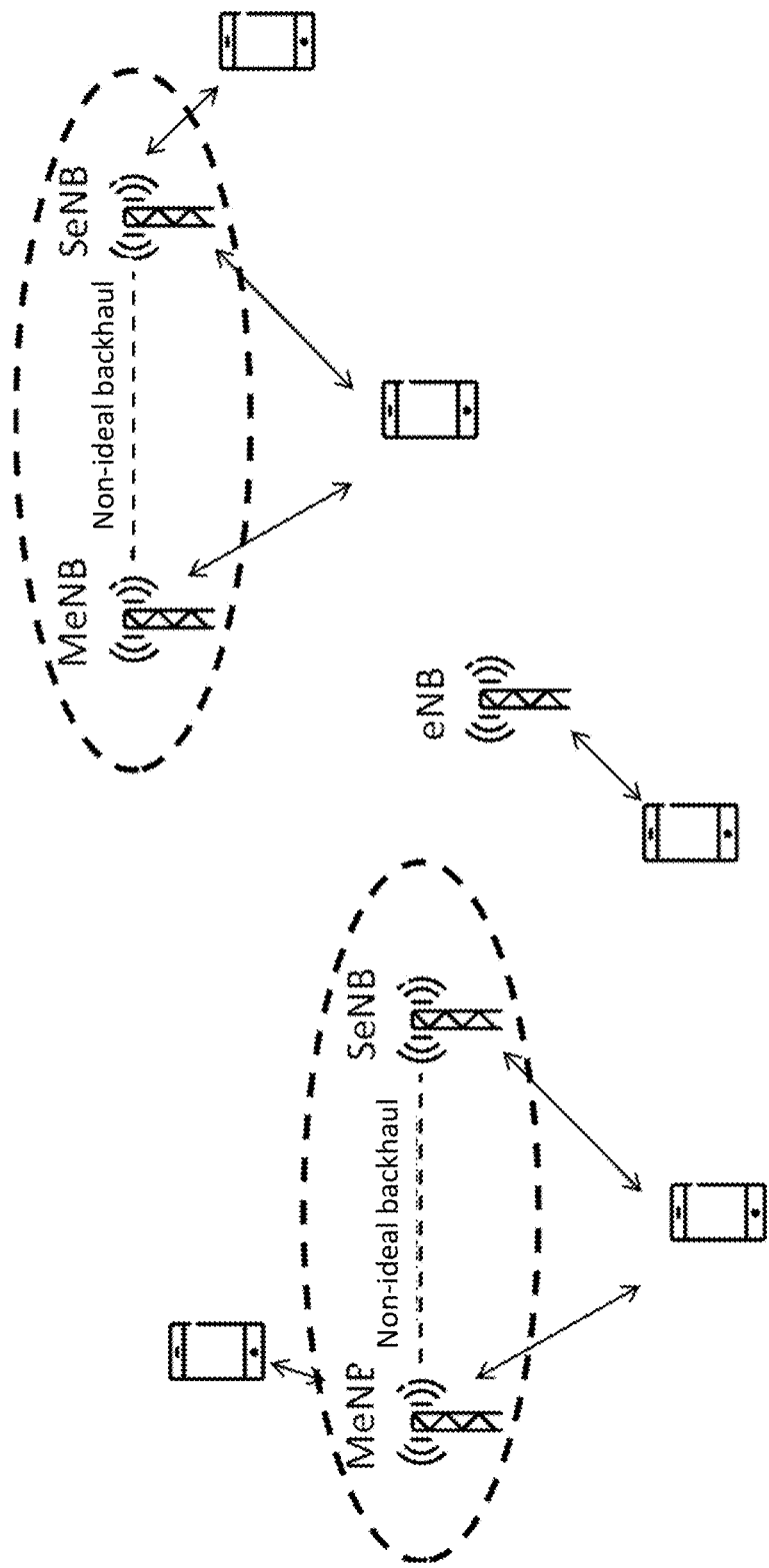
FIG. 5 shows a dual connectivity deployment scenario.

FIG. 5 shows an exemplary dual connectivity setup. In this example, only one SeNB is connected to terminal or UE, however, in general, more than one SeNB may serve the UE (serving a terminal or UE may generally refer to providing resources and/or at least on cell for cellular communication, e.g. a cell of a MCG or SCG, which may be the case for the SeNB). As shown in the figure, it is also clear that dual connectivity is a UE specific feature and a network node can support a dual connected UE and a legacy UE at the same time.

The anchor and booster roles of the network nodes may be defined from a terminal point of view and/or the roles may be terminal-dependent. This means that a network node that acts as an anchor to one terminal or UE may act as booster to another terminal or UE. Similarly, though the terminal or UE may read the system information from the anchor node, a node acting as a booster to one terminal or UE, may or may not distribute system information to another terminal or UE.

It is worth mentioning here that anchor node and MeNB may be used interchangeably and may be considered examples of a master network node; similarly, SeNB and booster node may also be used interchangeably in this specification and may be considered examples of a secondary network node. Generally, a (master) network node may be adapted to provide/and or provide the functionality of a master network node to at least one terminal and optionally the functionality of a secondary network node to one or more other terminals.

Generally, a master network node or MeNB may:
be adapted for providing/provide system information (e.g. for general terminal setup, e.g. via broadcast);
terminate a control plane and/or provide;
terminate a user plane;
whereas a secondary network node or SeNB may:
terminate a control plane
terminate only a user plane In one application, dual connectivity (which actually may comprise more than two network nodes communicating with the terminal) allows a terminal or UE to be connected to two network nodes to receive data from both nodes to increase its data rate. This application may be called user plane aggregation and achieves similar benefits as carrier aggregation, but may be used even with network nodes that are not connected by low-latency backhaul/network connection.

Generally, in dual connectivity, the scheduling (for receiving and transmitting) and HARQ-ACK feedback from the terminal or UE to each of the network nodes may be performed separately, which allows dealing with a lack of low-latency backhaul. In particular, the terminal or UE may have two UL transmitters to transmit UL control and data to the connected nodes.

PSCell activation in dual connectivity is discussed as follows. In dual connectivity, the terminal or UE may be connected to (at least) two eNodeBs (simultaneously; MeNB and SeNB or, more generally, a master network node and a secondary network node, which in the following may be represented by MeNB and SeNB). Each of them may have one or more associated SCells which may be configured for DL, or DL and UL CA operation. A MCG may be associated to the MeNB, and a SCG may be associated to the SeNB. The SCells may be time-aligned to the MeNB and SeNB, respectively, but the MeNB and SeNB may or may not be time aligned with respect to frame timing and/or a network reference (e.g. SFN) and/or each other. Two modes of operation may be defined:

Synchronized operation, where the downlink (sub/) frame time difference between PCell and PSCell is within a given value, e.g. ±33 us, and Unsynchronized (or asynchronous) operation, where the time difference between PCell and PSCell may be arbitrary, but may have a limited absolute value, e.g. 0.5 ms.

The master network node MeNB and/or the secondary network node SeNB and/or the terminal may be adapted such that for the primary cell of the secondary pSCell holds:
The PSCell is configured and/or controlled by the PCell (i.e. by MeNB)
The PSCell is activated at the configuration and cannot be deactivated by MeNB or SeNB.

Configuration and simultaneous activation of PSCell is done by MeNB, but otherwise the MeNB and SeNB operate the UE independently. Particularly, when the UE gets the SeNB activated it first has to carry out random access towards PSCell to establish a connection and get allocations so that it can send a first CQI report indicating the quality of the link as well as confirming that the activation has been successful.

Some common terminology used herein comprises:
Network node: In some embodiments a more general term "network node" is used, which may correspond to any type of radio network node or any network node, which communicates with a terminal or UE and/or with another network node. Examples of network nodes are NodeB, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

User equipment: In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc. Instead of user equipment, the term terminal may be used.

In the existing solutions, the UE/terminal is scheduled to send an activation success report of the PSCell to SeNB, while the MeNB may not be aware of this information (this reflects the independent control of the individual cell groups, as the terminal control may be left to the individual nodes, whereas upper layer control, e.g. control of the secondary node for example in handover, may rest at the master network node).

However the UE may not always be able to successfully activate the PSCell in SCG e.g. if signal quality of PSCell is poor, then the UE may fail to activate the PSCell. In this case the successful PSCell activation may be significantly delayed. This will in turn delay the UE access to the SCG and degrade UE performance even though dual connectivity capable UE is considered to be a high end wireless device. There is needed a mechanism whereby the network can address such a failure case and avoid UE performance degradation.

The approaches described herein provide a number of methods at both network node (e.g. MeNB, SeNB, positioning node etc) and terminal or UE to perform a number of operations related to dual connectivity.

A primary or master network node (e.g. MeNB, etc) may carry out and/or be adapted to carry out, for a terminal or UE configured with at least one serving cell in MCG and which is configured or (intended for) being configured with at least one serving cell in SCG:

Receiving information about the PSCell activation status from UE and/or another network node (e.g. SeNB);
Using the received information for at least one of:
Transmitting PSCell activation status to other relevant network nodes
Initiating new PSCell activation at UE upon receiving unsuccessful PSCell activation. These steps may be seen as implementation of a method for operating a network node (or master network node).

Additionally or alternatively, there may be considered a method for operating a network node in a wireless communication network. The network node may be a base station and/or eNodeB, and/or may be a master network node, in particular a master network node adapted for dual connectivity. The network node may be connected to a terminal via a cell group, in particular a master cell group. The method may comprise receiving, by the network node, information indicating an activation status of the terminal regarding a second cell group, in particular a secondary cell group. The second cell group may be provided and/or serviced and/or controlled by and/or associated to a second network node, in particular a secondary network node. The information may be received from a terminal, in particular the terminal in connection to the network node via the cell group (master cell group), and/or from another network node, in particular the second/secondary network node. The network node may receive the information from the terminal via the master cell group. The network node may receive the information from the other network node via an interface between the (master) network node and the (secondary) second network node. The information may be received in the form of an activation status message.

The network node may transmit, based on the received information, further information to the terminal and/or one or more further network nodes, e.g. the second network node and/or control nodes and/or the core network and/or one or more other secondary network nodes. The further information may be based on the activation status information and/or represent the activation status information. The further information may in particular instruct the receiver, e.g. the terminal and/or the second network node, to initiate a new activation procedure, e.g. to start a new random access procedure, for at least one of the cells of the second cell group, e.g. a secondary primary cell. The procedure may be one of the random access procedures described herein, in particular one without contention.

Additionally or alternatively, there may be considered a network node for a wireless communication network. The network node may be a base station and/or eNodeB, and/or may be a master network node, in particular a master network node adapted for, and/or comprising a dual connectivity or connectivity module for, dual connectivity.

The network node may be adapted for, and/or comprise a connection module for, being connected or connectable to a terminal via a cell group, in particular a master cell group. It may be considered that the network node is adapted for, and/or comprises a receiving module for, receiving information indicating an activation status of the terminal regarding a second cell group, in particular a secondary cell group. The second cell group may be provided and/or serviced and/or controlled by and/or associated to a second network node, in particular a secondary network node. The information may be received from a terminal, in particular the terminal in connection to the network node via the cell group (master cell group), and/or from another network node, in particular the second/secondary network node.

The network node and/or the receiving module may be adapted for receiving the information from the terminal via the master cell group. The network node and/or the receiving module may be adapted for receiving the information from the other network node via an interface between the (master) network node and the other network node, in particular the (secondary) second network node. The information may be received in the form of an activation status message.

The network node may be adapted for, and/or comprise a transmitting module for, transmitting, based on the received information, further information to the terminal and/or one or more further network nodes, e.g. the second network node and/or control nodes and/or the core network and/or one or more other secondary network nodes. The further information may be based on the activation status information and/or represent the activation status information. The further information may in particular instruct the receiver, e.g. the terminal and/or the second network node, to initiate a new activation procedure, e.g. to start a new random access procedure, for at least one of the cells of the second cell group, e.g. a secondary primary cell, and/or for another secondary cell group, which may be associated to another secondary network node. The procedure may be one of the random access procedures described herein, in particular one without contention.

A method performed in a secondary network node (e.g. SeNB, etc) for a UE configured with at least one serving cell in MCG and is configured or being configured with at least one serving cell in SCG may comprise:

Determining the PSCell activation status from UE (e.g. based on RA or missed RA attempts within certain time period);

Transmitting information related to the determined PSCell activation status to another network node (e.g. MeNB).

These steps may be seen as an implementation of a method for operating a secondary network node.

Additionally or alternatively, there may be considered a method for operating a secondary network node in a wireless communication network. The secondary network node may be a base station and/or eNodeB, and/or may be adapted for dual connectivity. The secondary network node may be connected or connectable to a terminal via a secondary cell group. The method may comprise determining, by the secondary network node, the activation status of the terminal regarding the secondary cell group. The method may comprise transmitting, to a network node, in particular a master network node, information indicating the activation status, which may be the determined activation status of the terminal. The second cell group may be provided and/or serviced and/or controlled by and/or associated to the secondary network node. The secondary network node may transmit the information via an interface between the (master) network node and the secondary network node. The information may be transmitted in the form of an activation status message.

Additionally or alternatively, there may be considered a secondary network node for a wireless communication network. The secondary network node may be a base station and/or eNodeB, and/or may be adapted for, and/or comprise a connectivity module for, dual connectivity. The secondary network node may adapted for, and/or comprise a connection module for, being connected or connectable to a terminal via secondary cell group. The secondary network node may be adapted for, and/or comprise a determining module for, determining the activation status of the terminal regarding the secondary cell group. The secondary network node may further be adapted for, and/or comprise a transmitting module for, transmitting, to a network node, in particular a master network node, information indicating the activation status, which may be the determined activation status of the terminal. The secondary network node and/or the connection module may be adapted for providing and/or servicing and/or controlling the secondary cell group, and/or the secondary cell group may be associated to the secondary network node. The secondary network node and/or the transmitting module may be adapted for transmitting the information via an interface between the (master) network node and the secondary network node. The information may be transmitted in the form of an activation status message.

There is described a method performed at the UE or terminal, which is configured with at least one serving cell in MCG and is configured or being configured with at least one serving cell in SCG, comprising:

Obtaining a request to activate a PSCell in SCG;
Attempting to activate the PSCell;
Transmitting information about the said activation status of PSCell to the network node (e.g. MeNB), said information indicates whether the PSCell has been successfully or unsuccessfully activated by the UE.

These steps may be seen as an implementation of a method for operating a terminal.

Additionally or alternatively, there may be considered a method for operating a terminal in a wireless communication network. The terminal may be adapted for dual connectivity. The terminal may be connected or connectable to a cell group, in particular a second or secondary cell group. The method may (optionally) comprise determining, by the terminal, the activation status of the terminal regarding the secondary cell group. The method may comprise transmitting, to a network node, in particular a master network node, information indicating the activation status, which may be the determined activation status of the terminal. The second cell group may be provided and/or serviced and/or controlled by and/or associated to the secondary network node. The terminal may transmit the information via a master cell group. The activation status information may be transmitted in the form of an activation status message.

A secondary network node may be adapted for providing and/or servicing and/or controlling the secondary cell group, and/or the secondary cell group may be associated to the secondary network node. The method may further comprise, before determining the activation status and/or transmitting corresponding information, performing an activation and/or access procedure regarding the secondary cell group, by the terminal. The activation status may be determined based on and/or after performing such procedure. The procedure may be performed, by the terminal, in response to receiving, by the terminal, of a request to activate the secondary cell group. The request may be received from a network node, in particular the secondary network node. The procedure may be performed with the secondary network node, e.g. by exchanging corresponding messages, in particular RA messages.

Additionally or alternatively, there may be considered a terminal for a wireless communication network. The terminal may be adapted for, and/or comprise a connectivity module for, dual connectivity. The terminal may be adapted for, and/or comprise a connection module, for being connected or connectable to a cell group, in particular a second or secondary cell group. The terminal (optionally) may be adapted for, and/or comprise a determining module for, determining the activation status of the terminal regarding the secondary cell group. The terminal may be adapted for, and/or comprise a transmitting module for, transmitting, to a network node, in particular a master network node, information indicating the activation status, which may be the determined activation status of the terminal. The second cell group may be provided and/or serviced and/or controlled by and/or associated to the secondary network node. The terminal and/or the transmitting module may be adapted for transmitting the information via a master cell group.

The activation status information may be transmitted in the form of an activation status message. A secondary network node may be adapted for providing and/or servicing and/or controlling the secondary cell group, and/or the secondary cell group may be associated to the secondary network node. The terminal may be adapted for, and/or comprise an activation and/or access request module for, performing an activation and/or access procedure regarding the secondary cell group, in particular before determining the activation status and/or transmitting corresponding information. The activation status may be determined based on and/or after performing such procedure. The terminal and/or activation and/or access request module may be adapted for performing the procedure in response to receiving, by the terminal and/or a receiving module of the terminal, of a request to activate the secondary cell group. The request may be received from a network node, in particular the secondary network node. The procedure may be performed with the secondary network node, e.g. by exchanging corresponding messages, in particular RA messages.

The advantages of these approaches include:
The relevant network nodes are aware of the PSCell activation status.
New PSCell activation is initiated in the case of initial unsuccessful PSCell activation attempt.
The statistics about the PSCell activation status can be used by the network nodes for determining a suitable PSCell for a UE in future.

It may be considered that the terminal and/or the network node and/or the secondary network node are adapted for and/or support, and/or comprise respective connectivity modules for, dual connectivity. The network node may be adapted for, and/or comprise a cell module for, providing the (master) cell group, and/or may be adapted as a master network node. The (master) cell group may comprise a primary cell. The secondary network node may be adapted for, and/or comprise a cell module for, providing the second or secondary cell group, and/or may be adapted as a secondary network node. The second or secondary cell group may comprise a primary cell, in particular a secondary primary cell. The terminal may be adapted for dual connectivity, in particular to be able to activate and/or communicate via the (master) cell group and the second or secondary cell group.

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are applicable to single carrier as well as to multicarrier or carrier aggregation (CA) operation of the terminal or UE in which the terminal or UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers.

The serving cell is interchangeably called as primary cell (PCell) or primary serving cell (PSC). Similarly the secondary serving cell is interchangeably called as secondary cell (SCell) or secondary serving cell (SSC). The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

It is straight-forward to extend the concepts to FDD-FDD inter-band, or TDD-TDD inter-band or TDD intra-band, or to a combination of FDD and TDD inter-band carriers. The descriptions are also equally applicable to more than one SeNBs. In this IvD, we mention PSCell as the Secondary PCell, meaning the cell in the SeNB with PCell-type structure. In some literature, this is also mentioned as PUCCH Scell, since this is SCell that carrier PUCCH. In some literature, this is also notified as Primary SCell, since the main SCell in SeNB which has PCell type behavior and structure.

In the following, several variants or steps, e.g. to inform the MeNB regarding the successful (or unsuccessful) activation and/or deactivation of PSCell, are described (corresponding e.g. to determining and/or transmitting information regarding the activation status). They include:
A method for operating a master or primary network node (e.g. MeNB), in particular for determining a PSCell activation status;
A method for operating a master or primary network node (e.g. MeNB) of using the determined PSCell activation status;
A method for operating a master or a primary network node (e.g. MeNB) of determining PSCell activation status;

The master or primary network node (e.g. MeNB) may obtain/receive information regarding/about the activation status of a primary serving/secondary cell (e.g. PSCell) in a secondary network node (e.g. SeNB) and/or of a secondary cell group by one or more of the following means:
acquisition of information about the PSCell activation status from terminal (receiving information transmitted by the terminal/UE, e.g. via a master cell group and/or primary cell)
acquisition of information about the PSCell activation status from secondary network node (receiving information transmitted by the secondary network node, e.g. via an interface like a Xn or X2 interface)

Methods in a UE to inform MeNB regarding PSCell activation status are discussed as follows.

Upon receiving the command to activate a PSCell, the terminal or UE may attempt to perform the activation. The UE typically receives the command from the primary or the main network node e.g. MeNB. The term PSCell activation may also be interchangeably termed as the PSCell configuration or even PSCell configuration and activation. For the sake of simplicity the term PSCell activation is used hereinafter. During the PSCell activation procedure, the terminal or UE synchronizes to the PSCell and sends random access to the PSCell upon successful synchronization. However, the UE may or may not be fully successful in activating the PSCell. For example the UE may fail to do so in case the PSCell received signal quality is below a threshold (e.g. SINR is below −3 dB).

The UE stores the outcome of the procedure to attempt to activate the PSCell activation procedure i.e. whether the PSCell was successfully activated or not. The UE then signals information about this outcome to the network node using explicit or implicit indication as described below.

At the end of activation process, the terminal or UE may inform the master network node via the PCell (primary cell), whether the activation attempt was successful or not. This can be done by explicit indicator or message, e.g. an activation status message, in:
1. MAC CE, or
2. RRC message to/via PCell This message may contain any of the following or combinations of any of the followings:
  The confirmation of successful PSCell activation
  The confirmation of unsuccessful PSCell activation
  Information (e.g. cell identifier) about other cells which can be potential PSCell(s) for the UE e.g. cells whose DL signal quality as measured by the UE is above a threshold.
  The time duration (T0) used for PSCell activation by the UE.

For example the UE may signal either value of T0 or may inform only whether the T0 is the same as, longer than or shorter than the pre-defined PSCell activation delay.

Figure 6:
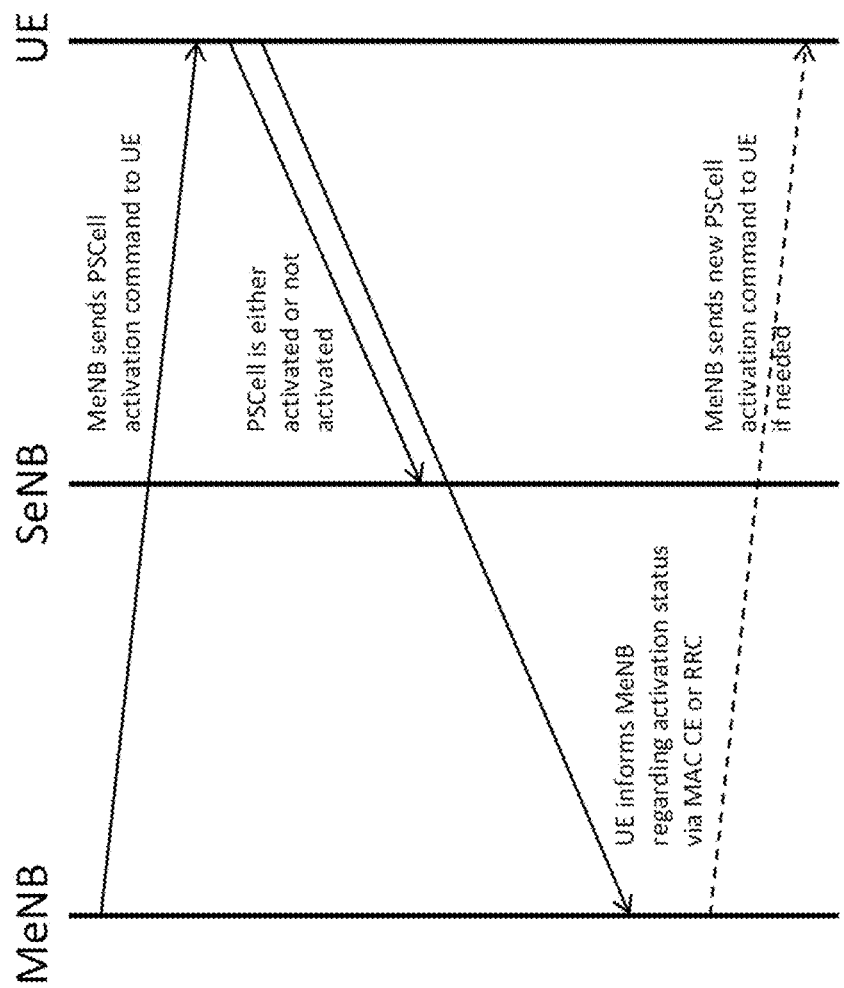
FIG. 6 shows a UE report to a MeNB regarding a PSCell activation status.

FIG. 6 shows a UE report to MeNB regarding PSCell activation status and subsequent MeNB new PSCell activation command, if needed.

FIG. 6 describes the procedure in an exemplary detail. The MeNB commands a UE to activate a PSCell. When the PSCell is activated, then UE sends an activation report to SeNB e.g. random access to the SeNB as an indication that the PSCell has been activated by the UE. Simultaneously, the UE also sends a PSCell activation status report to MeNB. If the PSCell activation is unsuccessful, then MeNB may send another PSCell activation command to the UE e.g. requests UE to activate another PSCell.

In another example, the UE can inform the MeNB regarding the PCell activation status implicitly. For example the UE may be configured to send to the MeNB certain type of pre-defined signal which indicates whether the PSCell is activated or not. For example the UE may send certain value of CQI or CQI pattern, such as CQI index 0 and index 1 corresponding to unsuccessful and successful PSCell activation respectively.

In another example the UE may be configured with two different random access (RA) preambles or sequences (S1 and S2) to indicate whether the PSCell is activated or not. If the UE sends RA to the MeNB using S1, then the MeNB assumes that the PSCell has been successfully activated. If the UE sends RA to the MeNB using S2, then MeNB assumes that the PSCell has NOT been successfully activated by the UE.

A method in a network node to inform MeNB regarding PSCell activation status is described as follows. In this mechanism, the secondary network node (e.g. SeNB) determines that the PSCell activation has been successfully performed by the UE in case a random access (request or message) sent by the UE has been received at the PSCell.

However, if no RA has been received from the UE within certain time duration (e.g. T1), then the SeNB may assume that the PSCell activation has not been successfully performed by the UE. The SeNB is informed by the MeNB about the expected PSCell activation attempt starting from a certain time instance. The UE is required to successfully activate the PSCell within pre-defined time duration. Therefore, the SeNB can determine the value of T1 based on pre-defined time duration and expected time when UE starts the PSCell activation procedure.

In one example, a SeNB can inform/transmit, via a X2 interface, the activation status of the PSCell to the MeNB. This message (which may be an activation status message) may contain any of the following or combinations of any of the followings:
  The confirmation of successful PSCell activation
  The confirmation of unsuccessful PSCell activation
  The time used for PSCell activation by the UE
  Information (e.g. cell identifier) about other potential PSCells FIG. 7 shows network coordination between a SeNB and a MeNB regarding PSCell activation status via X2, and a subsequent MeNB new PSCell activation command if needed.

Figure 7:
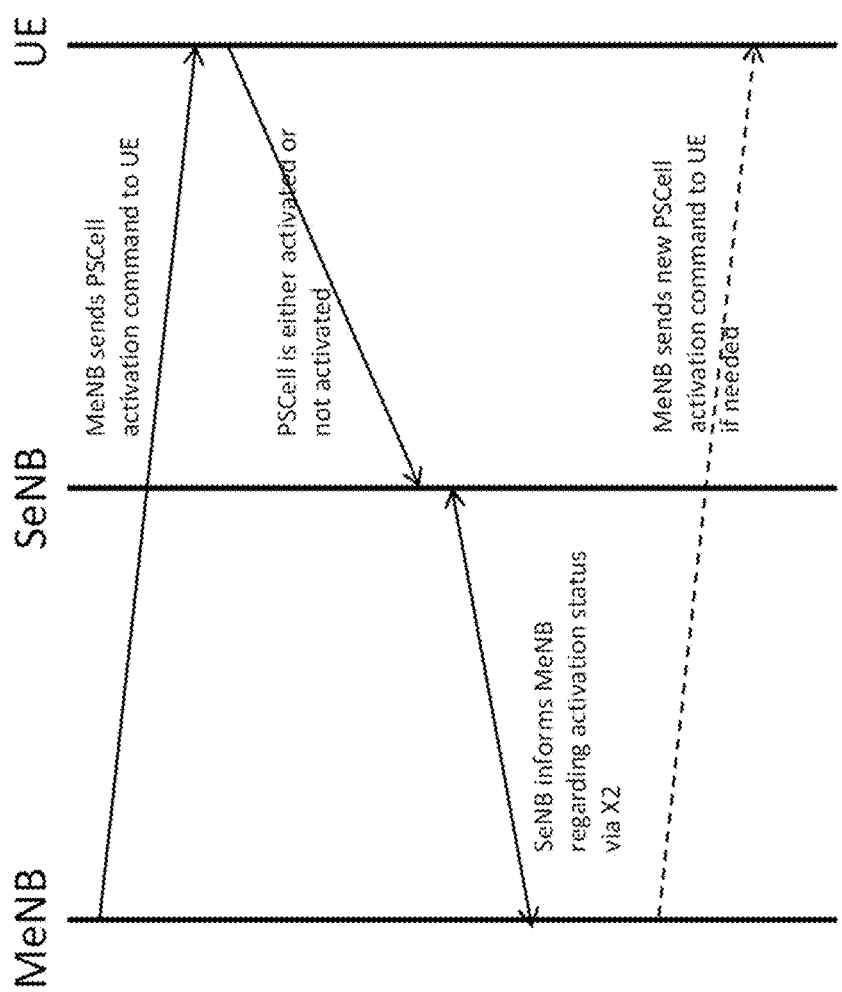
FIG. 7 shows network coordination between a SeNB and a MeNB regarding PSCell activation status via X2.

FIG. 7 explains an exemplary embodiment, wherein the network nodes coordinate among each other regarding the PSCell activation status and the MeNB send the re-activation command if needed.

There is described a method in a master or primary network node of using received PSCell activation status. The primary network node (e.g. a MeNB) may use the received information about the PSCell activation status for one or more of the following purposes:
  Signal information about the PSCell activation status to other network nodes
  Informing UE to restart PSCell activation
  Requesting UE to activate another PSCell A method in a master or primary network node informing PSCell activation based on PSCell activation status to other network nodes is discussed as follows. The master or primary network node (e.g. MeNB) may signal the information about the PSCell activation status to other network nodes e.g. SeNB, neighboring network nodes, core network node etc. The signaled information also includes information about the UE that has successfully or unsuccessfully activated that PSCell.

The receiving network node may store this received information and use this at a future time e.g. to determine which PSCells are activated with higher probability and use them in future as PSCell. The receiving network node (e.g. SeNB) may recommend another cell as PSCell for a UE in case the old PSCell has not been successfully activated by the UE.

A method in a network node requesting UE to restart PSCell activation based on PSCell activation status is discussed as follows.

If a master or primary network node (e.g. MeNB) determines that the PSCell was not successfully activated, then the primary network node (e.g. PCell in MeNB) may request the UE to again activate (respectively, try to activate) that PSCell. The primary network node may send such request to the same UE for activating the same PSCell for at least K (e.g. K=4) number of times within certain time duration (e.g. T2=500 ms).

The master or primary network node may also take into account the measurement quality of UE measurement performed in the PCell and/or PSCell when determining parameters such as K and T2. For example, if the PSCell measurement quality is below a threshold (e.g. −3 dB) then the primary network node may send the PSCell activation request only twice over T2 i.e. K=2. Generally, the master or primary network node may be adapted for determining parameters like K and T2, and/or may comprise a corresponding module. Determining may be performed based on measurement results and/or connection quality (and/or channel quality) and/or channel status and/or SIR and/or SINR and/or SNR, and/or channel state information (e.g. CQI, HARQ responsed and/or CSI related parameters), e.g. reported by the UE.

A method in a network node requesting a UE to activate or try another PSCell activation based on previous PSCell activation status is discussed as follows.

In this embodiment, in case the master or primary network node (e.g. MeNB) determines that PSCell was not successfully activated by the UE, then the primary network node may request the UE to activate another PSCell.

The master or primary network node may take into account the measurement quality of UE measurement performed on a PSCell when determining the new candidate PSCell. The master or primary network node may further take into account the frequency band or carrier frequency of a PSCell when determining the new candidate PSCell. The master or primary network node may further take into account the recommendation (e.g. recommended list of potential PSCells) received from the UE and/or other network nodes (e.g. SeNB).

For example the master or primary network node may select the new PSCell based on:
- Which has lower carrier frequency than the old PSCell that was not successfully activated by the UE and/or
- Whose signal quality as measured by the UE is above a threshold and/or
- Cell, which has been recommended by UE and/or by other network node, for use as a potential PSCell.

For a terminal or UE configured or being configured with dual connectivity operation (i.e. MCG and SCG), the master or primary network node may be adapted to and/or perform:
- determine whether or not the UE has successfully activated a PSCell that was requested to be activated by the UE (e.g., utilizing a corresponding determining module) and/or
- uses the information of the status of the PSCell activation for enhancing DC operation of the UE, e.g. by sending or transmitting a request to the UE for activating the same or new PSCell.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions.

Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein.

A corresponding program code may be stored in an associated memory and/or storage medium and/or be hard-wired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-UTRAN and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or network node and/or base station (e.g. eNodeB) and/or relay node and/or any device generally adapted for communication in a wireless communication network, in particular cellular communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA. It may be considered that a terminal or user equipment comprises radio circuitry and/control circuitry for wireless communication. Radio circuitry may comprise for example a receiver device and/or transmitter device and/or transceiver device.

Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device.

Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station.

A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, e.g. a base station or eNodeB, may be adapted to provide and/or define and/or control one or more cells, e.g. a group of cells, which may be carrier aggregated (CA) cells. The group of cells may comprise at least one primary cell, which may be considered to be a member of the group and/or to be associated to the group. The cell group may comprise one or more secondary cells (it should be noted that every group may comprise secondary cells, not only a secondary group; the secondary in this context refers to being secondary to the primary cell of a group). A primary cell may be adapted and/or utilised for providing control information (in particular allocation data, and/or scheduling and/or allocation information regarding the primary cell and/or the group of cells to and/or from a terminal connected for communication (transmission and reception) and/or configured with the cell. The control information may pertain to the primary cell and/or the group of cells. Each primary cell and/or the associated group may be associated to a specific network node. A master network node may be adapted to provide and/or service and/or define a primary cell in a master cell group. A secondary network node may be adapted to provide and/or service and/or define a secondary cell group.

A terminal may be adapted to be configured with and/or to communicate via master cell group (at least one primary cell) for communicating with a master network node. Additionally, a terminal may be adapted to be configured with and/or to communicate via secondary cell group (at least one (secondary) primary cell) for communicating with a secondary network node; the terminal may generally be adapted for dual connectivity. The terminal may comprise suitable circuitry, e.g. a first transmitter and/or receiver and/or transceiver circuitry (e.g., for communicating with the master network node) and a second first transmitter and/or receiver and/or transceiver circuitry (e.g., for communicating with the secondary network node/s).

A network node, in particular a base station, and/or a terminal, in particular a UE, may be adapted for communication in spectral bands (frequency bands) licensed and/or defined for LTE.

Resources or communication resources may generally be frequency and/or time resources, which may comprises e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/ or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/ scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data.

Figure 8:
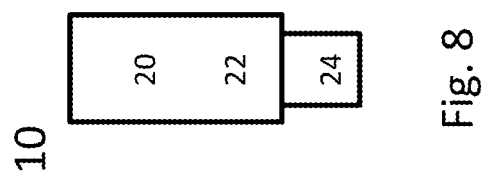
FIG. 8 schematically shows a terminal.

FIG. 8 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Figure 9:
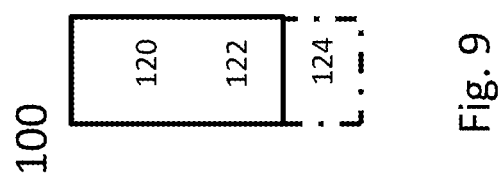
FIG. 9 schematically shows a network node.

FIG. 9 schematically show a network node or base station 100, which in particular may be an eNodeB. Network node 100 comprises control circuitry 120, which may comprise a controller connected to a memory. A receiving module and/or transmitting module and/or control or processing module and/or scheduling module and/or CIS receiving module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

There may be considered a network node adapted for performing any one of the methods for operating a network node described herein.

There may be considered a terminal adapted for performing any one of the methods for operating a terminal described herein.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium.

A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

An uplink carrier may generally be or indicate a carrier and/or frequency band intended and/or used for uplink transmissions.

A downlink carrier may generally be or indicate a carrier and/or frequency band intended and/or used for downlink transmissions.

A terminal and/or network node may be adapted, and/or comprise a connectivity module for, supporting dual connectivity. For example, a terminal, and/or its connectivity module, may be adapted to communicate, in particular to transmit and/or receive control and/or scheduling and/or allocation data, with more than one network node, one of which may be a master network node and at least one other node may be a secondary node. A master network node, and/or its connectivity module, may be adapted to control functionality of a secondary network node in dual connectivity, in particular handover between secondary network node; the master network node, and/or its connectivity module, may be adapted to transmit and/or receive corresponding control signaling to the secondary network node, e.g. via a backhaul and/or communication interface, e.g. a X2 interface.

A network node may generally comprise a corresponding backhaul and/or communication interface. It may be considered that the backhaul may be non-ideal, i.e. it may have high latency (high latency may be latency which is too high to perform real-time control and/or to provide synchronized scheduling and/or allocating of resource by the master network node for the communication between the secondary network node and the terminal; alternatively or additionally, high latency may be latency higher than a predetermined high latency threshold value, which may be dependent on the implemented system and/or standard, e.g. LTE). Alternatively, it may be considered that the backhaul is ideal, allowing (in principle) such kind real-time control. A secondary network node, and/or its connectivity module, may be adapted to receive control information from a master network node. A master network node may generally be adapted for secondary network node functionality, e.g. for another terminal, and vice versa.

A terminal being configured with a cell and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the terminal.

Activation of a cell, in particular of a primary cell of a secondary group of cells, may refer to a status of the terminal in respect to the cell. In particular, activation of a cell may refer to the terminal adapting and/or configuring itself to allow communication, in particular scheduled communication with the node servicing the cell via the cell. Activation of a cell for/by a terminal may comprise configuring and/or setting a timing and/or time alignment of/for the cell by the terminal, e.g. in response to receiving a timing message providing a corresponding parameter, e.g. a timing advance value and/or a time alignment value (which may be an absolute value or a relative value, e.g. representing a difference to a reference value). The timing message may be provided by a specific message and/or be part of a message comprising additional information, e.g. a response and/or a scheduling message, e.g. a random access response message (e.g. MSG2 discussed herein).

It may be considered that a network node is adapted for, and/or comprises a timing message module for, transmitting a timing message to a terminal, in particular in response to an access request message transmitted by the terminal. The network node may be adapted for, and/or comprise an access request module for receiving and/or processing an access request transmitted by a terminal. The terminal may be adapted for, and/or comprise an access requesting module for, performing a random access procedure and/or transmitting an access request and/or receiving at least one request response message from a network node, one of which may be a timing message. The terminal may generally be adapted for, and/or comprise an activation and/or timing module for, activating a cell and/or group of cells based on a message from a network node, e.g. a timing message. The activation and/or timing module may be part of an access requesting module.

Information regarding the activation status of a cell and/or group of cells (for a given terminal) may refer to and/or indicate whether (the given terminal) has activated the cell or not and/or whether it tried to activate it or not. The information may be provided in form of an activation status message and/or include in another message or form of transmission, which may be transmitted by a terminal and/or a network node, in particular the terminal having the status and/or the network node providing the cell and/or group of cells. The cell and/or group of cells may comprise a primary cell, in particular a secondary primary cell and/or primary cell of a secondary group of cells. The activations status of one cell may be representative for the group of cells.

A terminal may be adapted to perform an activation procedure, in which it activates a cell based on a timing message and/or timing parameter received from a network node providing and/or servicing and/or defining and/or scheduling the cell. The activation procedure may be part of an access procedure, in particular a random access procedure.

An access procedure/request may generally be a random access procedure as described herein, e.g. with contention resolution or contention-free. It may be performed between a terminal and/or network node to access and/or time align and/or activate a cell, for the terminal, the cell being provided and/or serviced and/or defined and/or controlled by and/or associated to the network node. An activation procedure may comprise an access procedure. It should be noted that the result of a performed access or activation procedure may be a failure, if the terminal was not able to activate the cell, e.g. due to unfavorable reception conditions.

Determining an activation status, e.g. the PSCell activation status, by a network node may comprise request and/or receive activation status information from the terminal or UE. Alternatively or additionally, it may be performed by a secondary network node based on activation data, e.g. based on RA or missed RA attempts, e.g. within certain time period. Determining the activation status by the terminal may comprise reading a corresponding register or memory or setting of the terminal, by the terminal and/or control circuitry of the terminal.

| Abbreviation | Explanation |
|---|---|
| CCA | Clear Channel Assessment |
| DCI | Downlink Control Information |
| DL | Downlink |
| DMRS | Demodulation Reference Signals |
| eNB | evolved NodeB, base station |
| TTI | Transmission-Time Interval |
| UE | User Equipment |
| UL | Uplink |
| LA | Licensed Assisted |
| LA | Licensed Assisted Access |
| DRS | Discovery Reference Signal |
| SCell | Secondary Cell |
| SRS | Sounding Reference Signal |
| LBT | Listen-before-talk |
| PCFICH | Physical Control Format Indicator Channel |
| PDCCH | Physical Downlink Control Channel |
| PUSCH | Physical Uplink Shared Channel |
| PUCCH | Physical Uplink Control Channel |
| RRM | Radio Resource Management |
| CIS | Transmission Confirmation Signal |
| 3GPP | $3^{rd}$ Generation Partnership Project |
| Ack/Nack | Acknowledgment/Non-Acknowledgement, also A/N |
| AP | Access point |
| B1, B2, . . . | Bandwidth of signals, in particular carrier bandwidth |
| Bn | Bn assigned to corresponding carrier or frequency f1, f2, . . . , fn |
| BER/BLER | Bit Error Rate, BLock Error Rate; |
| BS | Base Station |
| CA | Carrier Aggregation |
| CoMP | Coordinated Multiple Point Transmission and Reception |
| CQI | Channel Quality Information |

| Abbreviation | Explanation |
|---|---|
| CRS | Cell-specific Reference Signal |
| CSI | Channel State Information |
| CSI-RS | CSI reference signal |
| D2D | Device-to-device |
| DL | Downlink |
| EPDCCH | Enhanced Physical DL Control CHannel |
| DL | Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE) |
| eNB | evolved NodeB; a form of base station, also called eNodeB |
| E-UTRA/N | Evolved UMTS Terrestrial Radio Access/Network, an example of a RAT |
| f1, f2, f3, ..., fn | carriers/carrier frequencies; different numbers may indicate that the referenced carriers/frequencies are different |
| f1_UL, ..., fn_UL | Carrier for Uplink/in Uplink frequency or band |
| f1_DL, ..., fn_DL | Carrier for Downlink/in Downlink frequency or band |
| FDD | Frequency Division Duplexing |
| ID | Identity |
| L1 | Layer 1 |
| L2 | Layer 2 |
| LTE | Long Term Evolution, a telecommunications standard |
| MAC | Medium Access Control |
| MBSFN | Multiple Broadcast Single Frequency Network |
| MDT | Minimisation of Drive Test |
| MME | Mobility Management Entity; a control entity of a wireless communication network (LTE) providing control functionality e.g. for radio network nodes like eNodeB |
| NW | Network |
| OFDM | Orthogonal Frequency Division Multiplexing |
| O&M | Operational and Maintenance |
| OSS | Operational Support Systems |
| PC | Power Control |
| PCell | Primary Cell (e.g. in CA, in particular a primary cell of a Master Cell Group) |
| PDCCH | Physical DL Control CHannel |
| PH | Power Headroom |
| PHR | Power Headroom Report |
| Pscell | primary cell of a secondary cell group |
| PSS | Primary Synchronization Signal |
| PUSCH | Physical Uplink Shared CHannel |
| R1, R2, ..., Rn | Resources, in particular time-frequency resources, in particular assigned to corresponding carrier f1, f2, ..., fn |
| RA | Random Access |
| RACH | Random Access Channel |
| RAN | Radio Access Network |
| RAT | Radio Access Technology |
| RE | Resource Element |
| RB | Resource Block |
| RRH | Remote radio head |
| RRM | Radio Resource Management |
| RRU | Remote radio unit |
| RSRQ | Reference signal received quality |
| RSRP | Reference signal received power |
| RSSI | Received signal strength indicator |
| RX | reception/receiver, reception-related |
| SA | Scheduling Assignment |
| SCell | Secondary Cell (e.g. in CA) |
| SINR/SNR | Signal-to-Noise-and-Interference Ratio; Signal-to-Noise Ratio |
| SFN | Single Frequency Network |
| SON | Self Organizing Network |
| SSS | Secondary Synchronization Signal |
| TPC | Transmit Power Control |
| TX | transmission/transmitter, transmission-related |
| TDD | Time Division Duplexing |
| UE | User Equipment |
| UL | Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency |
| DC | Dual Connectivity |
| MCG | Main Cell Group |
| SCG | Secondary Cell Group |
| PCell | Primary Cell |
| PSCell | Primary SCell |
| SCell | Secondary Cell |
| RACH | Random Access CHannel |

These and other abbreviations may be used according to LTE standard definitions

The invention claimed is:

1. A method for operating a network node in a wireless communication network, the network node being connected to a terminal via a first cell group, the method comprising:
receiving, by the network node, information indicating an activation status of the terminal regarding a second cell group; and
transmitting, by the network node, further information based on the received information to the terminal and one or more further network nodes for at least a pre-defined number of times,
wherein the further information instructs the terminal and the one or more further network nodes to initiate a new activation procedure for at least one cell of the second cell group, and wherein the new activation procedure comprises activation of the at least one cell of the second cell group based on a timing message or a timing parameter received, by the terminal and the one or more further network nodes, from the network node.

2. The method of claim 1, wherein the new activation procedure comprises the activation of the at least one cell of the second cell group further based on a carrier frequency of the at least one cell of the second cell group.

3. The method of claim 1, wherein the new activation procedure comprises the activation of the at least one cell of the second cell group further based on a threshold of quality of signal measurement on the at least one cell of the second cell group.

4. A network node for a wireless communication network, the network node being connected or connectable to a terminal via a first cell group, wherein the network node is adapted to:
receive information indicating an activation status of the terminal regarding a second cell group; and
transmit, based on the received information, further information to the terminal and one or more further network nodes for at least a pre-defined number of times,
wherein the further information instructs the terminal and the one or more further network nodes to initiate a new activation procedure for at least one cell of the second cell group, wherein the new activation procedure includes a random access procedure, and wherein the random access procedure is performed between the terminal and the network node to access, align, or activate the at least one cell of the second cell group.

5. A method for operating a terminal in a wireless communication network, the terminal being adapted for dual connectivity, the terminal being connected to a network node via a primary cell group, and the terminal further being connected or connectable to a secondary cell group, the method comprising:
- determining, by the terminal, an activation status of the terminal regarding the secondary cell group;
- transmitting, by the terminal to the network node, information indicating the determined activation status of the terminal regarding the secondary cell group; and
- receiving, by the terminal from the network node, further information for at least a pre-defined number of times based on the transmitted information, wherein the received further information instructs the terminal to initiate a new activation procedure for at least one cell of the secondary cell group, and wherein the new activation procedure comprises activation of the at least one cell of the secondary cell group based on a timing message or a timing parameter received, by the terminal, from the network node.

6. A terminal for a wireless communication network, the terminal being adapted for dual connectivity, the terminal being connected to a network node via a primary cell group, the terminal further being connected or connectable to a secondary cell group, and the terminal further being adapted to:
- determine, by the terminal, an activation status of the terminal regarding the secondary cell group;
- transmit, by the terminal to the network node, information indicating the determined activation status of the terminal regarding the secondary cell group; and
- receive, by the terminal from the network node, further information for at least a pre-defined number of times based on the transmitted information, wherein the received further information instructs the terminal to initiate a new activation procedure for at least one cell of the secondary cell group, wherein the new activation procedure includes a random access procedure, and wherein the random access procedure is performed between the terminal and the network node to access, align, or activate the at least one cell of the secondary cell group.

* * * * *